(12) United States Patent
Sumi et al.

(10) Patent No.: US 7,708,472 B2
(45) Date of Patent: May 4, 2010

(54) OPTICAL MODULE HOLDER, OPTICAL MODULE, AND OPTICAL CONNECTOR

(75) Inventors: Toshiharu Sumi, Kawaguchi (JP); Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/075,640

(22) Filed: Mar. 13, 2008

(65) Prior Publication Data

US 2008/0226238 A1    Sep. 18, 2008

(30) Foreign Application Priority Data

Mar. 14, 2007 (JP) ............................. 2007-065110
Sep. 11, 2007 (JP) ............................. 2007-235319
Jan. 9, 2008 (JP) ............................. 2008-002193

(51) Int. Cl.
*G02B 6/42* (2006.01)

(52) U.S. Cl. ....................................................... 385/91
(58) Field of Classification Search ................... 385/91
See application file for complete search history.

(56) References Cited

U.S. PATENT DOCUMENTS 6,742,938 B2 * 6/2004 Tanaka et al. ................. 385/94

2003/0202754 A1 * 10/2003 Kato et al. .................... 385/89
2005/0244109 A1 * 11/2005 Yabe et al. .................... 385/92

FOREIGN PATENT DOCUMENTS

JP    08-220386    8/1996
JP    2002-043675    2/2008

* cited by examiner

*Primary Examiner*—Jerry T Rahll
(74) *Attorney, Agent, or Firm*—William L. Androlia; H. Henry Koda

(57) ABSTRACT

It is to enhance mass-productivity through quick adhesion of an optical element 11 to an optical module holder 14 using an ultraviolet curable adhesive 7.

When an optical element 11 is adhered to an optical element attaching section 5 by an ultraviolet curable adhesive 7 through ultraviolet rays being irradiated onto the ultraviolet curable adhesive 7 applied onto a predetermined application surface 5a on an inner circumferential surface of the optical element attaching section 5 from an outer side of the optical element attaching section 5, a thin-walled section 20 for maintaining a transmittance of the ultraviolet rays transmitted through the optical element attaching section 5 at a predetermined value or higher is formed on the optical element attaching section 5.

10 Claims, 16 Drawing Sheets

OPTICAL MODULE HOLDER, OPTICAL MODULE, AND OPTICAL CONNECTOR

BACKGROUND OF THE INVENTION

1. Field of the Invention

The present invention relates to an optical module holder, an optical module, and an optical connector. In particular, the present invention relates to an n optical module holder, an optical module, and an optical connector that are suitable for attaching an optical element onto the optical module holder.

2. Description of the Related Art

An optical module for optically coupling a photoelectric conversion element and an optical fiber has been used for optical communication performed via the optical fiber. The photoelectric conversion element includes at least one of a light-emitting element or a light-receiving element. An optical component called an optical module holder is used during manufacture of an optical module such as this.

As shown in FIG. 29, an optical module holder 1 includes a lens 3, a cylindrical photoelectric conversion element attaching section 5, and a cylindrical optical fiber attaching section 6. The lens 3 is used to optically couple a photoelectric conversion element and an end section of an optical fiber. The photoelectric conversion element attaching section 5 extends towards one side (upper area in FIG. 29) in an optical axis direction (vertical direction in FIG. 29) of the lens 3, in relation to the lens 3. The optical fiber attaching section 6 extends towards another side (lower area in FIG. 29) in the optical axis direction (vertical direction in FIG. 29) of the lens 3, in relation to the lens 3.

In the optical module holder 1 such as this, the photoelectric conversion element is attached to an inner circumferential surface of the photoelectric conversion element attaching section 5 through adhesion using an adhesive, thereby configuring the optical module.

During the manufacture of an optical module such as this, before the photoelectric conversion element is attached to the optical module holder 1, a centering operation has conventionally been performed for adjusting an attachment position of the photoelectric conversion element to optimize a positional relationship between the lens 3 and the photoelectric conversion element.

An ultraviolet (UV) curable adhesive that hardens as a result of irradiation by ultraviolet rays has conventionally been used as the adhesive used in the attachment of the photoelectric conversion element accompanying the centering operation such as that described above. When the UV curable adhesive is used, the centering operation can be smoothly performed even when the UV curable adhesive remains applied onto the inner circumferential surface of the photoelectric conversion element attaching section 5, as long as the UV curable adhesive is not irradiated with the ultraviolet rays.

In the manufacture of the optical module involving the centering operation such as that described above, first, as shown in FIG. 30, a UV curable adhesive 7 is applied onto a predetermined application surface 5a on the inner circumferential surface of the photoelectric conversion element attaching section 5. The photoelectric conversion element 1 is then inserted into the photoelectric conversion element attaching section 5. Depending on photoelectric conversion element and photoelectric conversion element attaching section types, the UV curable adhesive can be applied after the photoelectric conversion element is inserted into the photoelectric conversion element holder.

The photoelectric conversion element 11 shown in FIG. 30 uses a so-called controlled area network (CAN) package system in which an element body (a light-emitting section 8 in FIG. 30) is enclosed within a package 10 that has a window 9. In a state in which the photoelectric conversion element 11 is inserted within the photoelectric conversion element attaching section 5, an outer circumferential surface of the package 10 is surrounded by the inner circumferential surface of the photoelectric conversion element attaching section 5.

Therefore, in the state in which the photoelectric conversion element 11 is inserted within the photoelectric conversion element attaching section 5, the UV curable adhesive 7 is present between the outer circumferential surface of the package 10 and the application surface 5a on the inner circumferential surface of the photoelectric conversion element attaching section 5.

At this time, the UV curable adhesive 7 is not yet irradiated with the ultraviolet rays. The UV curable adhesive 7 still retains fluidity. Therefore, the centering operation can be performed by, for example, the photoelectric conversion element 11 being rotated around an optical axis of the lens 3.

After the attachment position of the photoelectric conversion element 11 is decided by the centering operation, as shown in FIG. 31, the UV curable adhesive 7 is irradiated with the ultraviolet rays from outside of the photoelectric conversion element attaching section 5. As a result, the UV curable adhesive 7 is hardened.

As a result, the UV curable adhesive 7 achieves adhesive force. The photoelectric conversion element 11 is temporarily fixed at a post-centering-operation position by the adhesive force of the UV curable adhesive 7.

After being temporarily fixed, the photoelectric conversion element 11 temporarily fixed at the post-centering-operation position is firmly adhered at the position by an adhesive, such as an epoxy resin, having stronger adhesive force than the UV curable adhesive 7.

As a result of the photoelectric conversion element 11 being attached to the photoelectric conversion element attaching section 5 in this way, the optical module can be achieved.

Patent Literature 1 and Patent Literature 2, for example, disclose conventional technologies for configuring an optical module using a UV curable adhesive.

Patent Literature 1: Japanese Patent Laid-open Publication No. Heisei 8-220386

Patent Literature 2: Japanese Patent Laid-open Publication No. 2002-43675

However, conventionally, when a material having low ultraviolet ray transmittance is used as a material for forming the, photoelectric conversion element attaching section 5, a large amount of ultraviolet rays cannot be simultaneously irradiated onto the UV curable adhesive 7 applied onto the application surface 5a of the photoelectric conversion element attaching section 5 by the ultraviolet rays being transmitted through the photoelectric conversion element attaching section 5 from outside of the photoelectric conversion element attaching section 5.

As a result, conventionally, time required from when the irradiation of the UV curable adhesive 7 by the ultraviolet rays starts until when the UV curable adhesive 7 hardens (referred to, hereinafter, as hardening time) increases. Mass productivity of the optical module and the optical connector including the optical module cannot be improved.

SUMMARY OF THE INVENTION

The present invention has been achieved in light of the above-described problems. An object of the invention is to provide an optical module holder, an optical module, and an optical connector that can improve mass-productivity through quick adhesion of an optical element onto the optical module holder by a UV curable adhesive.

In order to achieve the aforementioned object, an optical module holder according to a first aspect of the present invention includes an optical coupling section, a cylindrical optical element attaching section, and an optical transmission line attaching section. The optical coupling section optically couples an optical element having at least one of either a light-emitting element or a light-receiving element and an end section of an optical transmission line. The optical element attaching section is used to attach the optical element at a position facing one optical function surface of the optical coupling section. The optical transmission line attaching section is used to attach the end section of the optical transmission line at a position facing another optical function surface of the optical coupling section. When the optical element is adhered to the optical element attaching section by a UV curable adhesive through ultraviolet rays being irradiated onto the UV curable adhesive disposed on a predetermined disposal surface on an inner circumferential surface of the optical element attaching section so as to pass through the optical element attaching section from an outer side of the optical element attaching section, a thin-walled section is formed to maintain transmittance of the ultraviolet rays passing through the optical element attaching section at a predetermined value or higher.

In the first aspect of the invention, when the optical element is adhered to the optical element attaching section by the UV curable adhesive, the ultraviolet rays can be transmitted through the thin-walled section from the outer side of the optical element attaching section and sufficiently irradiated on to the UV curable adhesive disposed on the disposal surface in a short amount of time. As a result, a hardening time of the UV curable adhesive can be shortened from a conventional hardening time. Mass-productivity of an optical module and an optical connector can be improved.

An optical module holder according to a second aspect is the optical module holder according to the first aspect in which a through-hole is formed near the disposal surface on the optical element attaching section. The through-hole passes from an outer circumferential surface of the optical element attaching section to the inner circumferential surface of the optical element attaching section. An entire circumference of the through-hole decreases towards an inner radial direction side of the optical element attaching section. The through-hole has a shape in which a portion of an inner circumferential surface of the through-hole is positioned on an outer radial direction side of the optical element attaching section in relation to the disposal surface. The thin-walled section is formed by a section sandwiched between the disposal surface on the optical element attaching section and the portion of the inner circumferential surface of the through-hole.

In the second aspect of the invention, the thin-walled section can be more simply formed. Therefore, the optical module holder, the optical module, and the optical connector can be more efficiently manufactured at a lower cost. Condensation in the optical element can be prevented by the through-hole. As a result, optical performance can be enhanced.

An optical module holder according to a third aspect is the optical module holder according to the second aspect in which an opening of the through-hole on the outer circumferential surface of the optical element attaching section is formed into a circular shape. An opening of the through-hole on the inner circumferential surface of the optical element attaching section is formed into a circular shape having a diameter smaller than that of the opening on the outer circumferential surface. The inner circumferential surface of the through-hole is shaped into a tapered shape.

In the third aspect of the invention, the thin-walled section can be more simply formed. As a result, further reduction in cost and improvement in mass-productivity can be actualized.

An optical module holder according to a fourth aspect is the optical module holder according the second aspect in which an opening of the through-hole on the outer circumferential surface of the optical element attaching section is formed into a polygonal shape formed from a plurality of side sections. The polygonal shape is that in which a shape refracting towards an inner side of the opening and a shape refracting towards an outer side of the opening along an entire-circumference direction of the opening alternately appear. An opening of the through-hole on the inner circumferential surface of the optical element attaching section is a polygonal shape smaller than the opening on the outer circumferential surface. The polygonal shape is formed by a plurality of side sections respectively parallel with the plurality of side sections of the opening on the outer circumferential surface. An inner circumferential surface of the through-hole is formed into a shape having a plurality of angled surfaces connecting mutually parallel side sections of the opening on the outer circumferential surface and the opening on the inner circumferential surface.

In the fourth aspect of the invention, surface area of the thin-walled section can be increased while restricting areas of the opening. As a result, further improvement in mass-productivity can be achieved through further shortening of the hardening time of the UV curable adhesive, while maintaining mechanical strength.

An optical module holder according to a fifth aspect is the optical module holder according to the first aspect in which a concave section is formed on an outer radial direction side of the optical element attaching section in a position opposing the disposal surface on the outer circumferential surface of the optical element attaching section. The concave section recesses towards an inner radial direction side of the optical element attaching section. The thin-walled section is formed by a section sandwiched between the disposal surface on the optical element attaching section and the concave section.

In the fifth aspect of the invention, the thin-walled section can be more simply formed. As a result, further reduction in cost and improvement in mass-productivity can be actualized.

An optical module holder according to a sixth aspect is the optical module holder according to the first aspect in which the disposal surface is concavely formed towards an outer circumferential surface side of the optical element attaching section to prevent the ultraviolet curable adhesive from flowing into the optical element side. The thin-walled section is formed by a section sandwiched between the disposal surface on the optical element attaching section and the outer circumferential surface of the optical element attaching section.

In the sixth aspect of the invention, the hardening time of the UV curable adhesive can be reduced. The UV curable adhesive can be prevented from flowing into the optical element, and optical performance can be maintained with more certainty.

An optical module holder according to a seventh aspect is the optical module holder according to the first aspect in which the optical module holder is integrally formed from a same material.

In the seventh aspect of the invention, the optical module holder can be efficiently manufactured at a lower cost.

An optical module according to an eighth aspect includes an optical module holder according to any one of the first to seventh aspects, and an optical element including at least one of either a light-emitting element or a light-receiving element.

In the eighth aspect of the invention, the hardening time of the UV curable adhesive when the optical element is adhered to the optical element attaching section by the UV curable adhesive can be shortened from a conventional hardening time. Mass-productivity of the optical module and the optical connector can be improved.

An optical connector according to a ninth aspect includes an optical module according to the eighth aspect, and a housing that houses the optical module.

In the ninth aspect of the invention, the hardening time of the UV curable adhesive when the optical element is adhered to the optical element attaching section by the UV curable adhesive can be shortened from a conventional hardening time. Mass-productivity of the optical connector can be improved.

EFFECT OF THE INVENTION

In the optical module holder, the optical module, and the optical connector of the invention, mass-productivity can be improved through quick adhesion of an optical element onto the optical module holder by a UV curable adhesive.

DETAILED DESCRIPTION OF THE PREFERRED EMBODIMENT

First Embodiment

A first embodiment of the present invention will be described with reference to FIG. 1 to FIG. 5.

Sections having a same or similar basic configuration as a conventional configuration are described using the same reference numbers.

Figure 1:
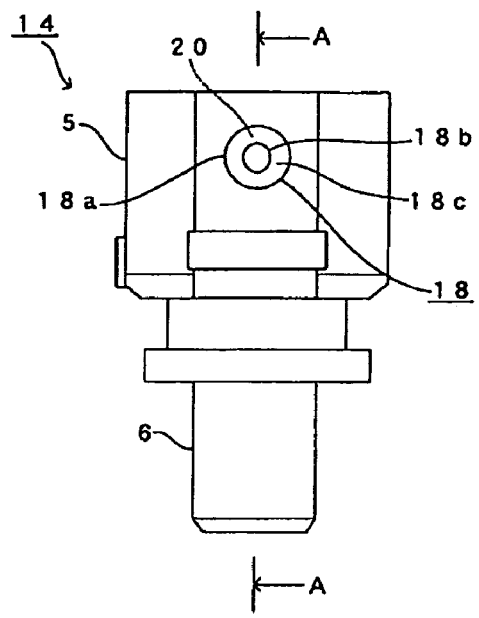
FIG. 1 is a front view of an optical module holder in an optical module holder, an optical module, and an optical connector according to a first embodiment of the present invention.
Figure 2:
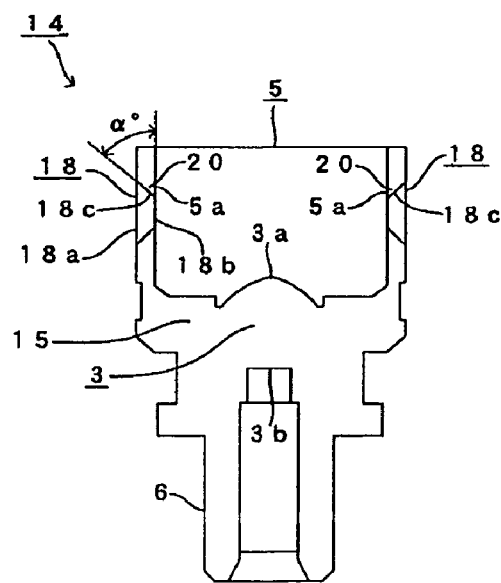
FIG. 2 is a cross-sectional view taken along A-A in FIG. 1.

FIG. 1 is a front view of an optical module holder 14 according to the embodiment. FIG. 2 is a cross-sectional view taken along A-A in FIG. 1.

As shown in FIG. 2, the optical module holder 14 according to the embodiment includes a lens 3 serving as an optical-coupling section for optically coupling a photoelectric conversion element and an end section of an optical fiber. The photoelectric conversion element serves as an optical element having at least one of either a light-emitting element (such as a laser diode) or a light-receiving element (such as a photodetector). The optical fiber serves as an optical transmission line.

In the lens 3, an optical function surface on the optical element side (referred to, hereinafter, as a first optical function surface 3a) is a convex lens surface. An optical function surface on the optical fiber side (referred to, hereinafter, as a second optical function surface 3b) is a flat surface.

A roughly circular ring-shaped flange section 15 extending towards an outer radial direction side of the lens 3 is provided around an outer circumference of the lens 3.

A cylindrical photoelectric conversion element attaching section 5 is formed on an outer radial direction end section of a surface of the flange section 15 on the first optical function surface 3a side. The photoelectric conversion element attaching section 5 serves as an optical element attaching section and extends in one (upwards in FIG. 1) optical axis direction (vertical direction in FIG. 1) of the lens 3. As a result of the photoelectric conversion element attaching section 5, the photoelectric conversion element can be attached to a position facing the first optical function surface 3a of the optical module holder 14.

At the same time, a cylindrical optical fiber attaching section 6 is formed at a position on the outer side of the second optical function surface 3b, on a surface of the flange section 15 on the second optical function surface 3b side. The optical fiber attaching section 6 serves as an optical transmission line attaching section and extends in another (downward in FIG. 1) optical axis direction of the lens 3. As a result of the optical fiber attaching section 6, the end section of the optical fiber can be attached to a position facing the second optical function surface 3b of the optical module holder 14.

The optical module holder 14 such as this is integrally formed by a same material, such as resin (for example, polyetherimide). Injection molding of a resin material can be performed to integrally form the optical module holder 14 such as this.

In addition to a basic configuration such as this, according to the embodiment, a thin-walled section is formed in the photoelectric conversion element attaching section 5. The thin-walled section is used to maintain transmittance of ultraviolet rays passing through the photoelectric conversion element attaching section 5 at a predetermined value or higher, when the photoelectric conversion element is adhered (temporarily fixed) to the photoelectric conversion element attaching section 5 by a UV curable adhesive. The photoelectric conversion element is adhered (temporarily fixed) by ultraviolet rays being irradiated onto the UV curable adhesive applied (disposed) onto a predetermined application surface (in other words, a disposal surface) on an inner circumferential surface of the photoelectric conversion element attaching section 5 so as to pass through the photoelectric conversion element attaching section 5 from outside of the photoelectric conversion element attaching section 5.

More specifically, as shown in FIG. 2, through-holes 18 are formed near a lower section of the UV curable adhesive application surface 5a on the inner circumferential surface of the photoelectric conversion element attaching section 5. The through-holes 18 pass from an outer circumferential surface of the photoelectric conversion element attaching section 5 to the inner circumferential surface.

According to the embodiment, two opposing positions in the radial direction on the inner circumferential surface of the photoelectric conversion element attaching section 5 are set as application surfaces 5a. Therefore, two through-holes 18 are formed in accompaniment.

As shown in FIG. 1, an opening 18a of the through-hole 18 on the outer circumferential surface of the photoelectric conversion element attaching section 5 is formed into a circular shape.

An opening 18b of the through-hole 18 on the inner circumferential surface of the photoelectric conversion element attaching section 5 is formed into a circular shape having a smaller diameter than the opening 18a on the outer circumferential surface.

Furthermore, as shown in FIG. 2, an inner circumferential surface 18c of the through-hole 18c (a second above the opening 18b in FIG. 2) is formed into a tapered shape. Therefore, the entire circumference decreases towards an inner radial direction side of the photoelectric conversion element attaching section 5.

A portion of the inner circumferential surface 18c of the through-hole 18 (a section above the opening 18b in FIG. 2) is positioned on an outer radial direction side of the photoelectric conversion element attaching section 5 relative to the application surface 5a. An outline of a vertical cross-section of the portion of the inner circumferential surface 18c (a cross-section taken along A-A in FIG. 1) forms an acute angle of a degrees in relation to an outline of a vertical cross-section of the application surface 5a, as shown in FIG. 2.

A thin-walled section 20 is simply formed by a section sandwiched between the application surface 5a in the photoelectric conversion element attaching section 5 and a portion of the inner circumferential surface 18c of the through-hole 18.

Figure 3:
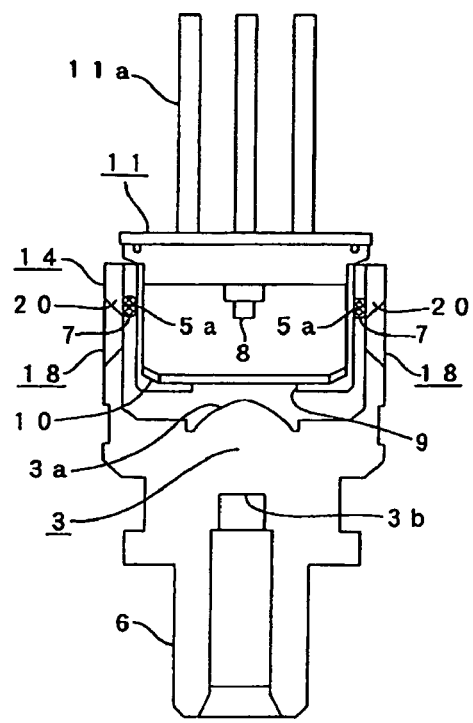
FIG. 3 is a vertical cross-sectional view of a photoelectric conversion element being temporarily fixed onto the optical module holder in the optical module holder, the optical module, and the optical connector according to the first embodiment of the present invention.
Figure 4:
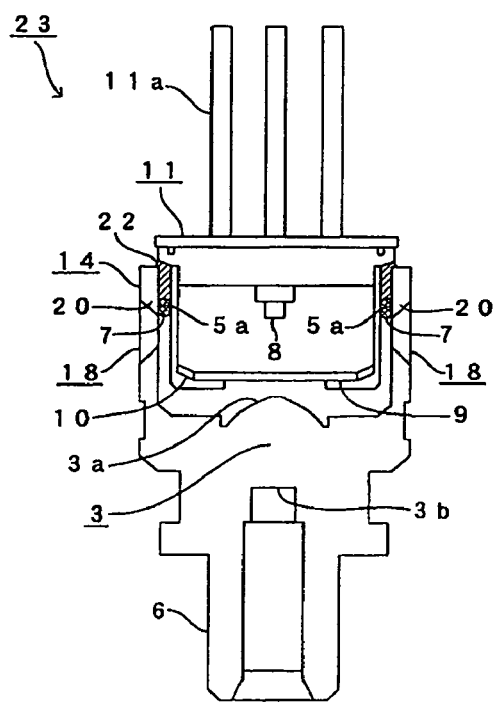
FIG. 4 is a vertical cross-sectional view of the optical module in the optical module holder, the optical module, and the optical connector according to the first embodiment of the present invention.

To manufacture an optical module and the optical connector using the optical module holder 14 formed as described above, as shown in FIG. 3, a UV curable adhesive 7 is applied onto the application surface 5a of the photoelectric conversion element attaching section 5 using a dispenser or the like. A photoelectric conversion element 11 is then inserted into the photoelectric conversion element attaching section 5. The photoelectric conversion element 11 shown in FIG. 3 is a CAN-package type photoelectric conversion element 11 that is the same as that shown in FIG. 27.

When the photoelectric conversion element 11 is inserted into the photoelectric conversion element attaching section 5, the UV curable adhesive 7 is present between the outer circumferential surface of a package 10 of the photoelectric conversion element 11 and the application surface 5a on the inner circumferential surface of the photoelectric conversion element attaching section 5. At this time, the package 10 of the photoelectric conversion element 11 faces the first optical function surface 3a of the lens in the optical axis direction (upwards in FIG. 3) of the lens 3.

At this time, the UV curable adhesive 7 is not yet irradiated with the ultraviolet rays. Therefore, a centering operation can be performed by the photoelectric conversion element 11 being moved (such as rotated) within the photoelectric conversion element attaching section 5.

After the centering operation of the photoelectric conversion element 11 is completed, the ultraviolet rays are irradiated onto the UV curable adhesive 7 using an ultraviolet light source from the outer side (outward radial direction) of the photoelectric conversion element attaching section 5.

At this time, the thin-walled section 20 is formed in the photoelectric conversion-element attaching section 5. Therefore, the ultraviolet rays can be transmitted through the thin-walled section 20 and sufficiently irradiated onto the UV curable adhesive 7 on the application surface 5a in a short amount of time.

As a result, a hardening time of the UV curable adhesive 7 can be shortened from a conventional hardening time. The photoelectric conversion element 11 can be quickly temporarily-fixed onto the optical module holder 14.

At this time, a space between the package 10 and the first optical function surface 3a can be ventilated outside of the photoelectric conversion element attaching section 5 by the through-holes 18 in the photoelectric conversion element attaching section 5. Therefore, condensation can be prevented from being formed on the lens 3 and the package 10. Optical performance (such as optical-coupling efficiency between the photoelectric conversion element 11 and the end section of the optical fiber) can be maintained.

Figure 14:
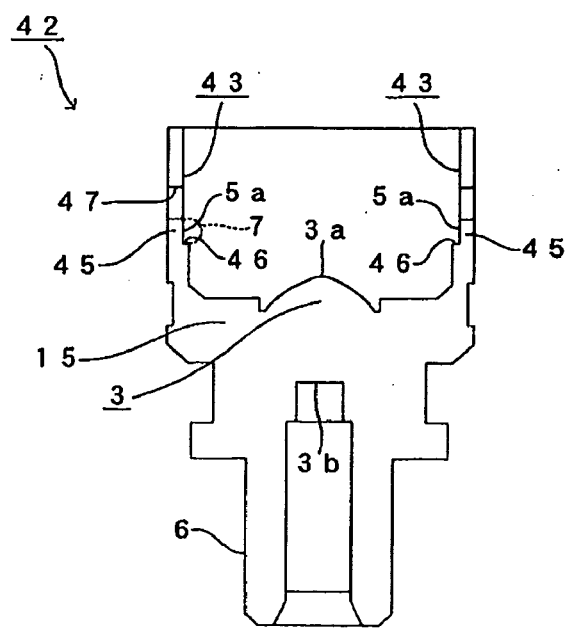
FIG. 14 is a cross-sectional view taken along E-E in FIG. 13.

After temporary fixing of the photoelectric conversion element 11 is completed in this way, as shown in FIG. 14, the photoelectric conversion element 11 is more firmly fixed at the post-temporary-fixing position by an adhesive 22 such as an epoxy resin. As a result, an optical module 23 can be achieved.

Figure 5:
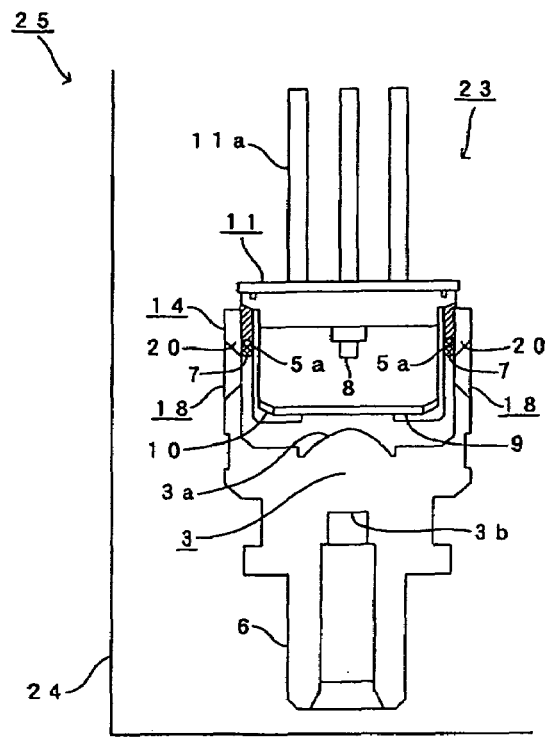
FIG. 5 is a schematic configuration diagram of the optical connector in the optical module holder, the optical module, and the optical connector according to the first embodiment of the present invention.

The optical module 23 manufactured as described above is housed within a housing 24, as shown in FIG. 5. A lead terminal 11a of the photoelectric conversion element 11 is connected to an electrical circuit board (not shown) within the housing 24. As a result, an optical connector 25 is achieved.

When designing the thin-walled section 20, a lower limit of ultraviolet ray transmittance that should be maintained by the thin-walled section 20 is predicted in advance. The lower limit of the transmittance can be changed depending on a concept. The ultraviolet ray transmittance that should be maintained by the thin-walled section 20 is preferably 10% or more. When the UV curable adhesive 7 according to the embodiment is used in FIG. 18, described hereafter, the transmittance is set to a value allowing the hardening time of the UV curable adhesive 7 to be kept within 600 seconds.

Second Embodiment

Next, a second embodiment of the present invention will be described with reference to FIG. 6 to FIG. 8.

Sections having a same or similar basic configuration as the first embodiment are described using the same reference numbers.

Figure 6:
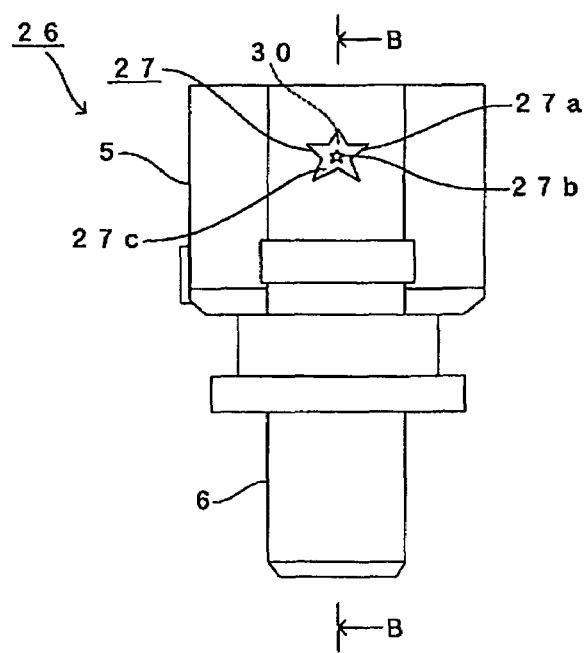
FIG. 6 is a front view of an optical module holder in an optical module holder, an optical module, and an optical connector according to a second embodiment of the present invention.

FIG. 6 is a front view of an optical module holder 26 according to the embodiment. FIG. 7 is a cross-sectional view taken along B-B in FIG. 6.

Figure 7:
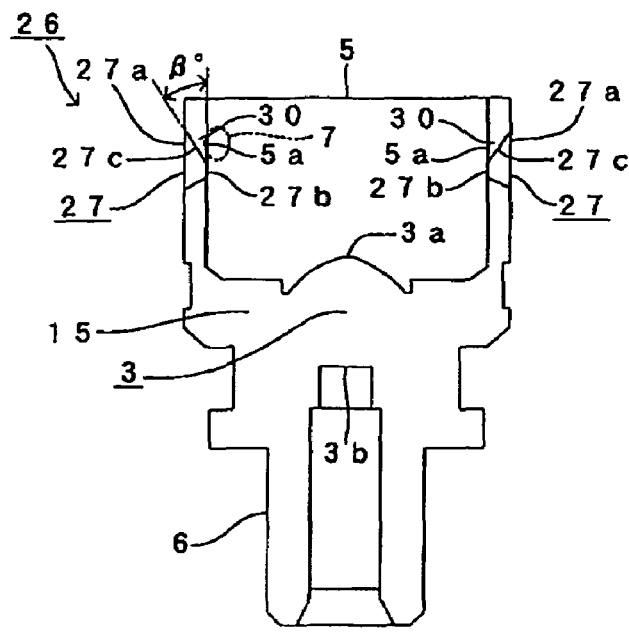
FIG. 7 is a cross-sectional view taken along B-B in FIG. 6.

As shown in FIG. 7, as according to the first embodiment, two opposing positions in the radial direction on the inner circumferential surface of the photoelectric conversion element attaching section 5 are set as the application surfaces 5a according to the embodiment. Two through-holes 27 are respectively formed near the lower section of the application surfaces 5a. The through-holes 27 pass from an outer circumferential surface of the photoelectric conversion element attaching section 5 to the inner circumferential surface. In FIG. 7, the UV curable adhesive 7 is indicated, for convenience, by a broken line on one application surface 5a to better show the size of the application surface 5a.

However, the through-hole 27 according to the embodiment is formed into a shape differing from that according to the first embodiment.

Figure 8:
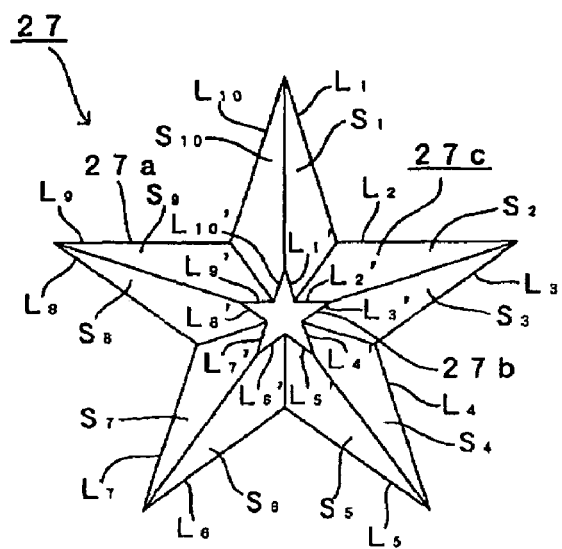
FIG. 8 is a front view of a detailed configuration of a through-hole in the optical module holder, the optical module, and the optical connector according to the second embodiment of the present invention.

In other words, as shown in FIG. 6 and FIG. 8, according to the embodiment, an opening 27a of the through-hole 27 on the outer circumferential surface of the photoelectric conversion element attaching section 5 is formed into a star-shaped pentagon formed by connecting ten linear side sections $L_1$ to $L_{10}$. A shape refracting towards the inner side of the opening 27a and a shape refracting towards the outer side of the opening 27a along an entire-circumference direction of the opening 27a alternately appear.

As shown in FIG. 6 and FIG. 8, an opening 27b of the through-hole 27 on the inner circumferential surface of the photoelectric conversion element attaching section 5 is formed into a star-shaped pentagon similar to the opening 27a on the outer circumferential surface. The entire circumference of the opening 27b is smaller than the opening 27a on the outer circumferential surface. The opening 27b is shaped into a star-shaped pentagon formed by ten side sections $L_1'$ to $L_{10}'$ that are parallel to the ten side sections $L_1$ to $L_{10}$ of the opening 27a on the outer circumferential surface.

As shown in FIG. 8, the through-hole 27 is formed so that an inner circumferential surface 27a is formed into a shape composed of ten angled surfaces $S_1$ to $S_{10}$ connecting mutually parallel side sections of the opening 27a on the outer circumferential surface and the opening 27b on the inner circumferential surface (for example $L_1$ and $L_1'$). The entire circumference of the inner circumferential surface 27c decreases towards the inner radial direction side of the photoelectric conversion element attaching section 5.

A portion of the inner circumferential surface 27c of the through-hole 27 (a section above the opening 27b in FIG. 7) is positioned on an outer radial direction side of the photoelectric conversion element attaching section 5 relative to the application surface 5a. An outline of a vertical cross-section of the portion of the inner circumferential surface 27c (a cross-section taken along B-B in FIG. 6) forms an acute angle of β degrees in relation to an outline of a vertical cross-section of the application surface 5a, as shown in FIG. 7.

A thin-walled section 30 is simply formed by a section sandwiched between the application surface 5a in the photoelectric conversion element attaching section 5 and a portion of the inner circumferential surface 27c of the through-hole 27.

In the optical module holder 26 formed as described above, as according to the first embodiment, when the photoelectric conversion element 11 is temporarily fixed, the ultraviolet rays can be transmitted through the thin-walled section 30 and sufficiently irradiated onto the UV curable adhesive 7 on the application surface 5a in a short amount of time. As a result, the hardening time of the UV curable adhesive 7 can be shortened from the conventional hardening time. Temporary fixing can be quickly performed.

The space between the package 10 and the first optical function surface 3a can be ventilated outside of the photoelectric conversion element attaching section 5 by the through-holes 27. Therefore, condensation can be prevented from being formed on the lens 3 and the package 10. Optical performance can be maintained.

According to the embodiment, the through-hole 27 is formed into a star-shaped pentagon. Therefore, a surface area of the thin-walled section 30 can be increased while restricting the areas of the opening 27a and the opening 27b. As a result, the hardening time of the UV curable adhesive 7 can be further shortened and the temporary fixing of the photoelectric conversion element 11 can be more quickly performed while maintaining mechanical strength.

According to the embodiment, as according to the first embodiment, after temporary fixing of the photoelectric conversion element 11 onto the optical module holder 26 is completed, the photoelectric conversion element 11 is more firmly fixed at the post-temporary-fixing position by the adhesive 22 such as an epoxy resin. As a result, an optical module can be achieved. Furthermore, the optical module is housed within the housing 24. The lead terminal 11a of the photoelectric conversion element 11 is connected to the electrical circuit board within the housing 24. As a result, an optical connector is achieved.

A through-hole of which the opening is formed into a star-shaped polygon other than the star-shaped pentagon can also be used as the through-hole.

According to the embodiment as well, the lower limit of ultraviolet ray transmittance that should be maintained by the thin-walled section 30 can be changed depending on a concept, focusing on a desired hardening time of the UV curable adhesive 7 (within how many seconds the UV curable adhesive 7 is hardened).

Third Embodiment

Next, a third embodiment of the present invention will be described with reference to FIG. 9 to FIG. 12.

Sections having a same or similar basic configuration as the first embodiment are described using the same reference numbers.

Figure 9:
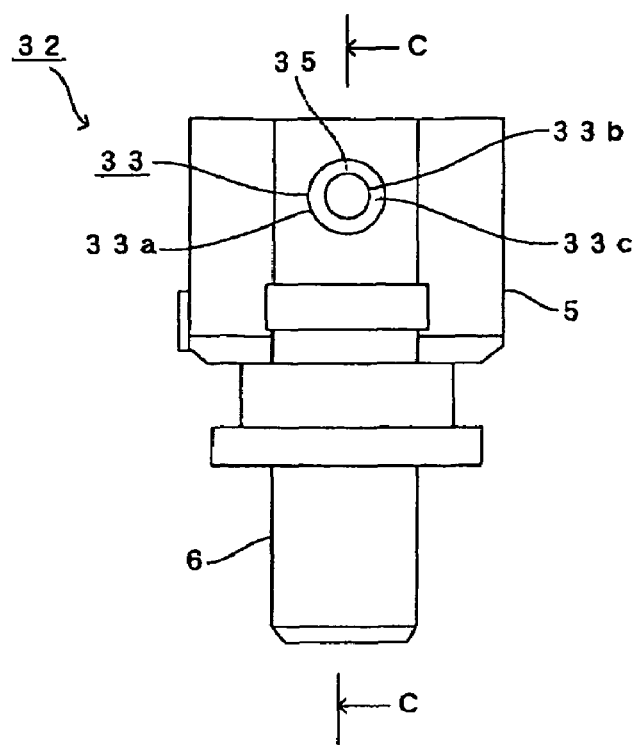
FIG. 9 is a front view of an optical module holder in an optical module holder, an optical module, and an optical connector according to a third embodiment of the present invention.
Figure 10:
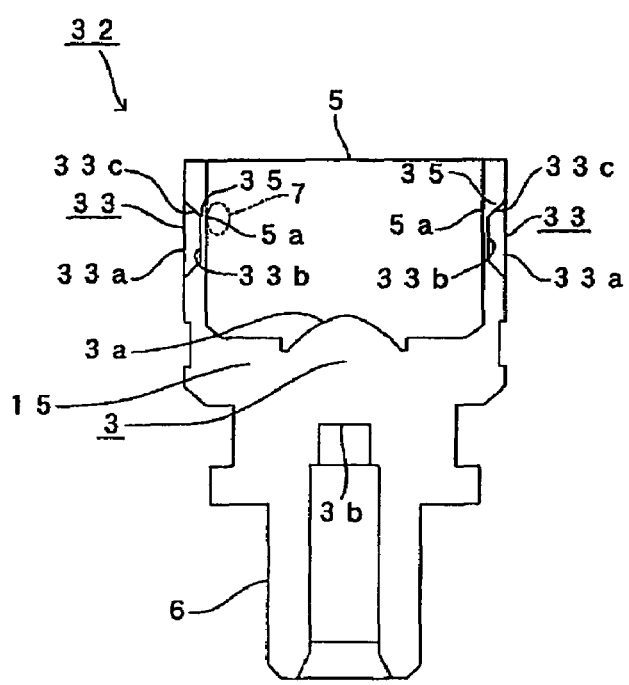
FIG. 10 is a cross-sectional view taken along C-C in FIG. 9.

FIG. 9 is a front view of an optical module holder 32 according to the embodiment. FIG. 10 is a cross-sectional view taken along C-C in FIG. 9.

In the optical module holder 32 according to the embodiment, a thin-walled section is not formed by the through-holes 18 and the through-holes 27 as shown according to the first embodiment and the second embodiment.

In other words, as shown in FIG. 9 and FIG. 10, according to the embodiment, concave sections 33 are formed in positions on an outer radial direction side of the photoelectric conversion element attaching section 5 facing the application surface on the outer circumferential surface of the photoelectric conversion element attaching section 5. The concave sections 33 recess towards the inner radial direction side of the photoelectric conversion element attaching section 5.

According to the embodiment as well, two opposing positions in the radial direction on the inner circumferential surface of the photoelectric conversion element attaching section 5 are set as the application surfaces 5a. Two concave sections 33 are also formed in accompaniment. In FIG. 10, the UV curable adhesive 7 is indicated, for convenience, by a broken line on one application surface 5a to better show the size of the application surface 5a.

The concave section 33 is formed by a circular opening 33a, a circular bottom surface 33b, and a tapered inner circumferential surface 33c. The bottom surface 33b is positioned on the inner radial direction side of the photoelectric conversion element attaching section 5 relative to the opening 33a. The bottom surface 33b has a smaller diameter than the opening 33a and is concentric with the opening 33a. The inner circumferential surface 33c connects the opening 33a and an outer circumferential end of the bottom surface 33b.

In FIG. 10, an upper half section of the concave section 33 faces the application surface 5a.

According to the embodiment, a thin-walled section 35 is simply formed by a section sandwiched between the application surface 5a in the photoelectric conversion element attaching section 5 and the concave section 33.

In the optical module holder 32 formed as described above, as according to the first embodiment, when the photoelectric conversion element 11 is temporarily fixed, the ultraviolet rays can be transmitted through the thin-walled section 35 and sufficiently irradiated onto the UV curable adhesive 7 on the application surface 5a in a short amount of time. As a result, the hardening time of the UV curable adhesive 7 can be shortened from the conventional hardening time. Temporary fixing can be quickly performed.

The shape of the bottom surface 33b of the above-described concave section 33 can be a planar surface or a curved surface curving along the inner circumferential surface of the photoelectric conversion element attaching section 5. When the bottom surface 33b is the planar surface, a shape of a mold forming the optical module holder 32 can be simplified. Therefore, manufacturing cost can be reduced. At the same time, when the bottom surface 33b is formed into the curved surface curving along the inner circumferential surface of the photoelectric conversion element attaching section 5, the thin-walled section 35 can be made evenly thin. A sufficient amount of ultraviolet rays can be irradiated onto the UV curable adhesive 7 from more directions. Therefore, the curved surface is more preferable for evenly hardening the UV curable adhesive 7 in a short amount of time.

(Variation Example)

Figure 11:
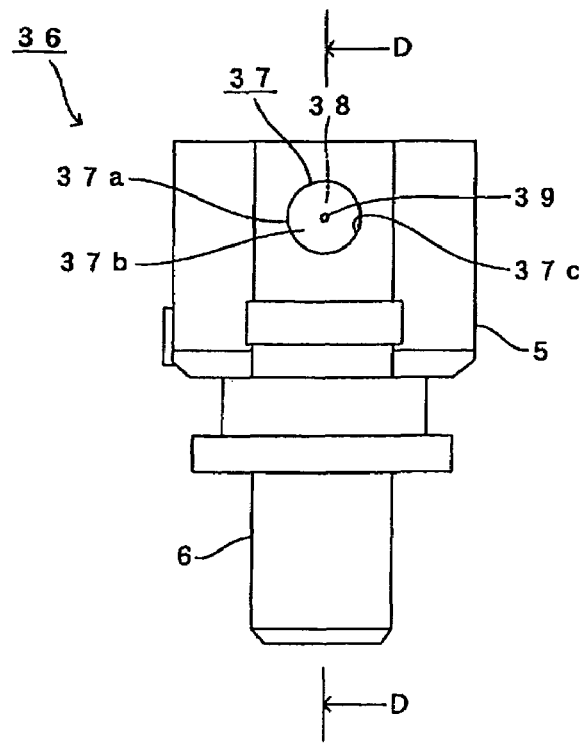
FIG. 11 is a front view of an optical module holder in a variation example of the optical module holder, the optical module, and the optical connector according to the third embodiment of the present invention.
Figure 12:
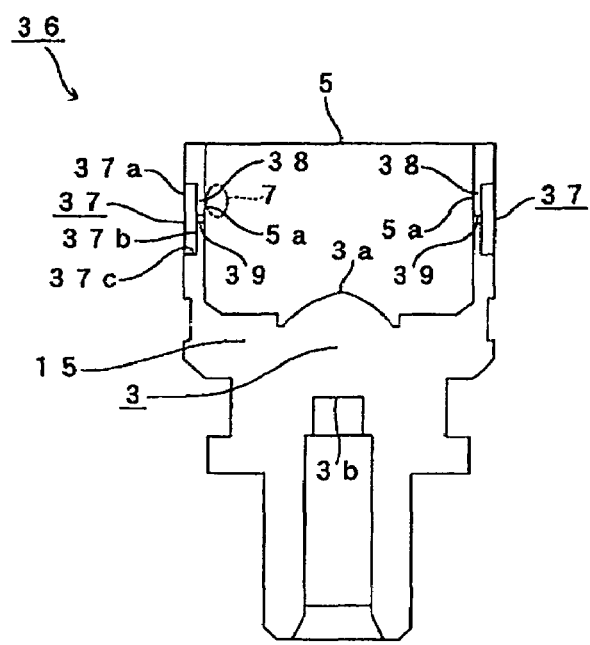
FIG. 12 is a cross-sectional view taken along D-D in FIG. 11.

As a variation example of the embodiment, an optical module holder 36 shown in FIG. 11 and FIG. 12 can be used. FIG. 11 is a front view of the optical module holder 36 of the variation example. FIG. 12 is a cross-sectional view taken along D-D in FIG. 11.

Like the optical module holder shown in FIG. 9 and 10, the optical module holder 36 shown in FIG. 11 and FIG. 12 has concave sections 37 at positions on an outer radial direction side of the photoelectric conversion element attaching section 5 facing the application surface on the outer circumferential surface of the photoelectric conversion element attaching section 5. The concave sections 37 recess towards the inner radial direction side of the photoelectric conversion element attaching section 5.

Because two opposing positions in the radial direction on the inner circumferential surface of the photoelectric conversion element attaching section 5 are set as the application surfaces 5a, two concave sections 37 of the variation example are also formed in accompaniment.

However, unlike the optical module holder shown in FIG. 9 and FIG. 10, the concave section 37 of the variation example is formed by a circular opening 37a, a circular bottom surface 37b, and a cylindrical inner circumferential surface 37c. The bottom surface 37b is positioned on the inner radial direction side of the photoelectric conversion element attaching section 5 relative to the opening 37a. The bottom surface 37b has a same diameter as the opening 37a and is concentric with the opening 37a. The inner circumferential surface 37c connects the opening 37a and an outer circumferential end of the bottom surface 37b.

In FIG. 12, an upper half section of the concave section 37 faces the application surface 5a.

In the variation example as well, a thin-walled section 38 is simply formed by a section sandwiched between the application surface 5a in the photoelectric conversion element attaching section 5 and the concave section 37.

Furthermore, a small through-hole 39 is formed in a center section of the bottom surface 37b of the concave section 37. The small through-hole 39 passes from the bottom surface 37b to the inner circumferential surface of the photoelectric conversion element attaching section 5. The small through-hole 39 is a fine through-hole with a diameter of about 0.2 millimeters.

Like the optical module holder shown in FIG. 9 and 10, in the optical module holder 36 formed as described above, when the photoelectric conversion element 11 is temporarily fixed, the ultraviolet rays can be transmitted through the thin-walled section 30 and sufficiently irradiated onto the UV curable adhesive 7 on the application surface 5a in a short amount of time. As a result, the hardening time of the UV curable adhesive 7 can be shortened from the conventional hardening time. Temporary fixing can be quickly performed. Shortening of the hardening time of the UV curable adhesive 7 such as this can be sufficiently achieved even when the small through-hole 39 is not formed (see FIG. 27, described hereafter).

In the variation example as well, the shape of the bottom surface 37b in the concave section 37 can be a planar surface or a curved surface curving along the inner circumferential surface of the photoelectric conversion element attaching section 5, for the same reasons as for the optical module holder in FIG. 9 and FIG. 10.

The UV curable adhesive 7 can be applied onto the application surface 5a from the outer side of the photoelectric conversion element attaching section 5, through the small through-hole 39. Therefore, unlike the optical module holder 14, the optical module holder 26, and the optical module holder 32 described above, the UV curable adhesive 7 can be applied after the photoelectric conversion element 11 is inserted into the photoelectric conversion element attaching section 5 and centering is completed.

Thus, centering can be prevented from being performed while the UV curable adhesive 7 is present between the package 10 of the photoelectric conversion element 11 and the photoelectric conversion element attaching section 5. As a result, the UV curable adhesive 7 can be prevented from flowing to the first optical function surface 3a side with certainty.

According to the embodiment as well, as according to the first embodiment, after temporary fixing of the photoelectric conversion element 11 onto the optical module holder 36 is completed, the photoelectric conversion element 11 is more firmly fixed at the post-temporary-fixing position by the adhesive 22 such as an epoxy resin. As a result, an optical module can be achieved. Furthermore, the optical module is housed within the housing 24. The lead terminal 11a of the photoelectric conversion element 11 is connected to the electrical circuit board within the housing 24. As a result, an optical connector is achieved.

According to the embodiment as well, the lower limit of ultraviolet ray transmittance that should be maintained by the thin-walled section 33 and the thin-walled section 38 can be changed depending on a concept, focusing on the desired hardening time of the UV curable adhesive 7.

Fourth Embodiment

Next, a fourth embodiment of the present invention will be described with reference to FIG. 13 to FIG. 15.

Sections having a same or similar basic configuration as the first embodiment are described using the same reference numbers.

Figure 13:
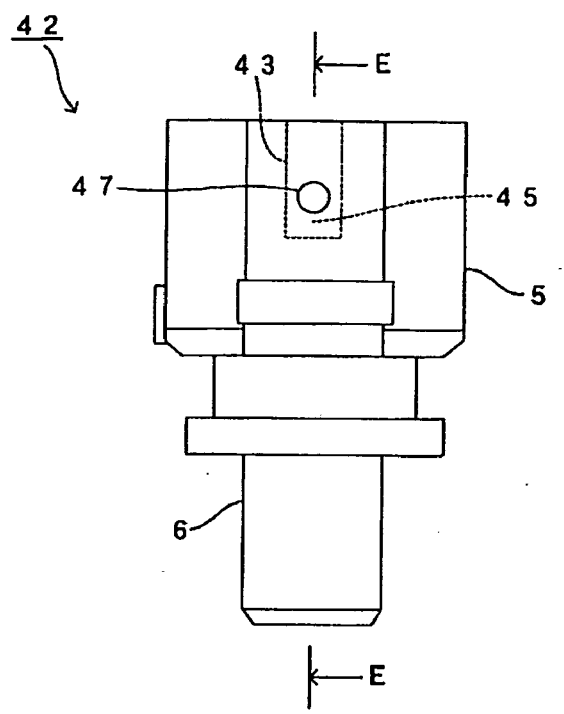
FIG. 13 is a front view of an optical module holder in an optical module holder, an optical module, and an optical connector according to a fourth embodiment of the present invention.

FIG. 13 is a front view of an optical module holder 42 according to the embodiment. FIG. 14 is a cross-sectional view taken along E-E in FIG. 13.

According to the embodiment, two opposing positions in the radial direction on the inner circumferential surface of the photoelectric conversion element attaching section 5 are set as the application surfaces 5a. Two concave sections 43 are formed by two areas of predetermined regions including the application surfaces 5a recessing towards the outer radial side of the photoelectric conversion element attaching section 5.

According to the embodiment, a lower end section of the concave section 43 is the application surface 5a. In FIG. 14, the UV curable adhesive 7 is indicated, for convenience, by a broken line on one application surface 5a to better show the size of the application surface 5a.

According to the embodiment, a thin-walled section 45 is simply formed by a section sandwiched between the outer circumferential surface of the photoelectric conversion element attaching section 5 and the application surface 5a.

As a result of the application surfaces 5a being concavely formed, according to the embodiment, as shown in FIG. 14, a shoulder 46 is formed between the application surface 5a on the inner circumferential surface of the photoelectric conversion element attaching section 5 and a section adjacent below and adjacent to the application surface 5a (lens 3 side).

A through-hole 47 is formed near an upper section of the application surface 5a of the photoelectric conversion element attaching section 5. The through-hole 47 passes through the photoelectric conversion element attaching section 5 in the radial direction.

In the optical module holder 42 formed as described above, when the photoelectric conversion element 11 is temporarily fixed, the ultraviolet rays can be transmitted through the thin-walled section 45 and sufficiently irradiated onto the UV curable adhesive 7 on the application surface 5a in a short amount of time. As a result, the hardening time of the UV curable adhesive 7 can be shortened from the conventional hardening time. Temporary fixing can be quickly performed.

Figure 15:
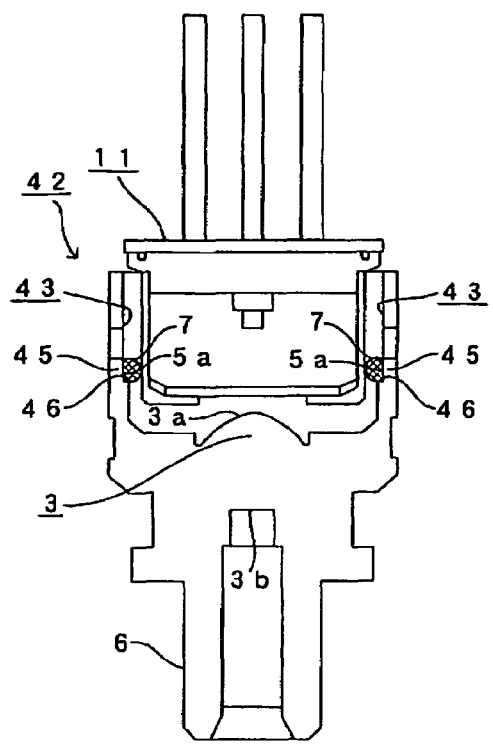
FIG. 15 is a vertical cross-sectional view of a photoelectric conversion element being temporarily fixed onto the optical module holder in the optical module holder, the optical module, and the optical connector according to the fourth embodiment of the present invention.

Furthermore, because the application surface 5a is concavely formed, as shown in FIG. 15, when the photoelectric conversion element 11 is temporarily fixed, the shoulder 46 can hold the UV curable adhesive 7 from below and serve as an adhesive reservoir. Therefore, flowing of the UV curable adhesive 7 onto the first optical function surface 3a can be suppressed with certainty, and the optical performance of the lens 3 can be maintained.

Moreover, the space between the package 10 and the first optical function surface 3a can be ventilated outside of the photoelectric conversion element attaching section 5 by the through-hole 47. Therefore, condensation can be prevented from being formed on the lens 3 and the package 10. Optical performance can be maintained.

According to the embodiment as well, the lower limit of ultraviolet ray transmittance that should be maintained by the thin-walled section 45 can be changed depending on a concept, focusing on the desired hardening time of the UV curable adhesive 7.

Fifth Embodiment

Next, a fifth embodiment of the present invention will be described with reference to FIG. 16 to FIG. 21.

Sections having a same or similar basic configuration as the first embodiment are described using the same reference numbers.

Figure 16:
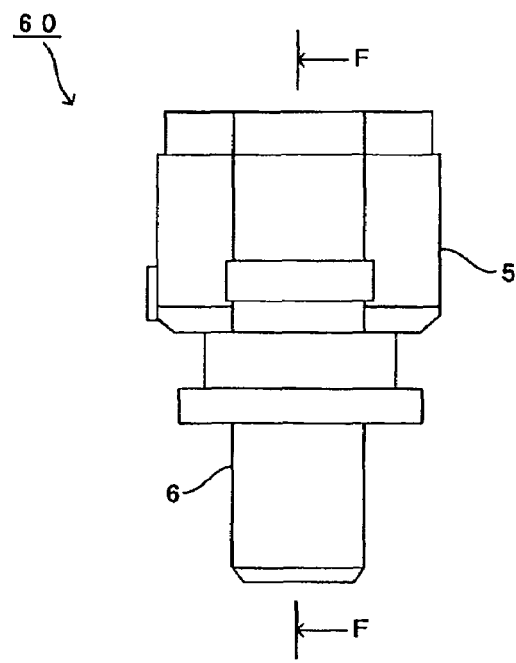
FIG. 16 is a front view of an optical module holder in an optical module holder, an optical module, and an optical connector according to a fifth embodiment of the present invention.
Figure 17:
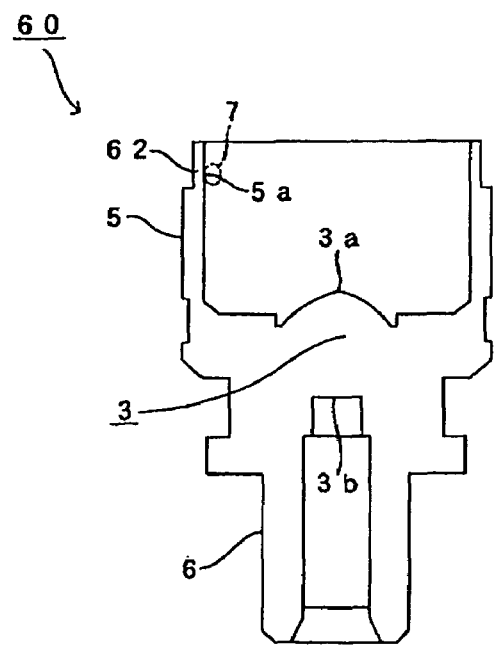
FIG. 17 is a cross-sectional view taken along F-F in FIG. 16.

FIG. 16 is a front view of an optical module holder 60 according to the embodiment. FIG. 17 is a cross-sectional view taken along F-F in FIG. 16.

As shown in FIG. 17 according to the embodiment, in a section of a predetermined region in the photoelectric conversion element attaching section 5 from a photoelectric conversion element end section (an upper end section in FIG. 17) towards the lens 3 side (downward in FIG. 17), a diameter of the outer circumferential surface is smaller than that of a section adjacent to the lens 3 side of the section of the predetermined region. A thin-walled section 62 is simply formed at the section at which the diameter of the outer circumferential surface decreased.

As shown in FIG. 17, the application surface 5*a* is set on an inner circumferential surface of the thin-walled section 62 in the photoelectric conversion element attaching section 5. In FIG. 17, the UV curable adhesive 7 is indicated, for convenience, by a broken line on the application surface 5*a* to better show the size of the application surface 5*a*.

In the optical module holder 60 formed as described above, as according to the first embodiment, when the photoelectric conversion element 11 is temporarily fixed, the ultraviolet rays can be transmitted through the thin-walled section 62 and sufficiently irradiated onto the UV curable adhesive 7 on the application surface 5*a* in a short amount of time. As a result, the hardening time of the UV curable adhesive 7 can be shortened from the conventional hardening time. Temporary fixing can be quickly performed.

Furthermore, according to the embodiment, the thin-walled section 62 is formed in the photoelectric conversion element side end section of the photoelectric conversion element attaching section 5. In accompaniment, the application surface 5*a* is set near the photoelectric conversion element side end section on the inner circumferential surface of the photoelectric conversion element attaching section 5. Therefore, an application operation for the UV curable adhesive 7 can is facilitated. A design concept in which the photoelectric conversion element 11 is fixed at a position farther away from the lens 3 than those according to each embodiment described above can be supported.

(First Variation Example)

Figure 18:
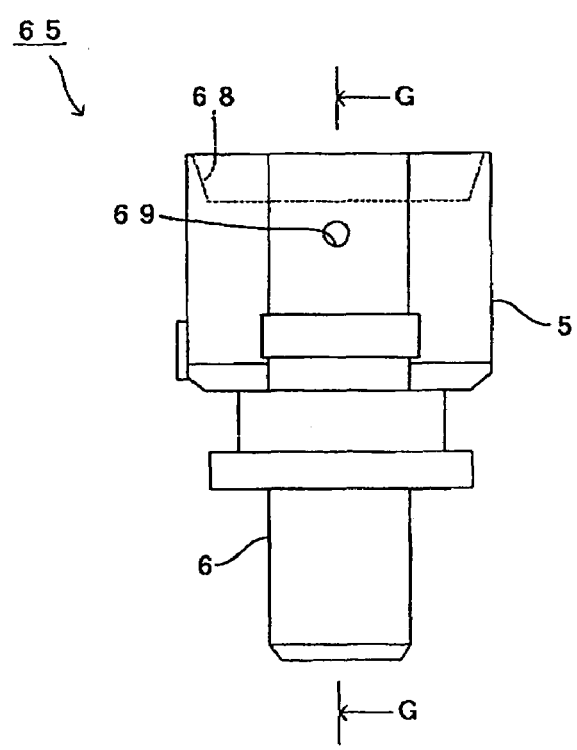
FIG. 18 is a front view of an optical module holder in a first variation example of the optical module holder, the optical module, and the optical connector according to the fifth embodiment of the present invention.
Figure 19:
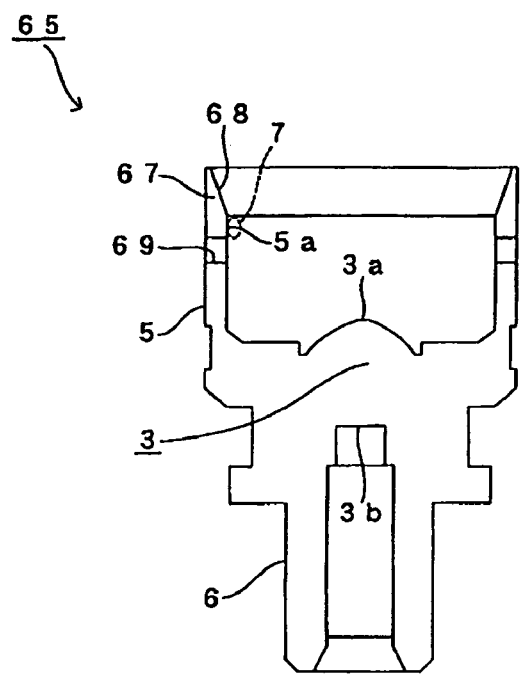
FIG. 19 is a cross-sectional view taken along G-G in FIG. 18.

The optical module holder 65 shown in FIG. 18 and FIG. 19 can be used as a first variation example according to the embodiment. FIG. 18 is a front view of the optical module holder 65 of the first variation example. FIG. 19 is a cross-sectional view taken along G-G in FIG. 18.

As shown in FIG. 19, in the optical module holder 65 of the first variation example, like the optical module holder shown in FIG. 16 and FIG. 17, a thin-walled section 67 is formed on the photoelectric conversion element side end section (an upper end section in FIG. 19) of the photoelectric conversion element attaching section 5. The application surface 5*a* is set near the photoelectric conversion element side end section on the inner circumferential surface of the photoelectric conversion element attaching section 5.

However, in the first variation example, a taper 68 is formed on the photoelectric conversion element attaching section 5, in a predetermined region from the photoelectric conversion element side end section on the inner circumferential surface of the photoelectric conversion element attaching section 5 towards the lens 3 side. An inner diameter of the taper 68 decreases towards the lens 3 side. The thin-walled section 67 is formed by a section sandwiched between the taper 68 and the outer circumferential surface of the photoelectric conversion element attaching section 5. According to the embodiment, the application surface 5*a* is set to a position slightly shifted from the thin-walled section 67. Specifically, as shown in FIG. 19, the application surface 5*a* is set to a position shifted slightly towards the lens 3 side (downward) than a lens side end section (lower ends section in FIG. 19) of the taper 68.

A through-hole 69 is formed near the lens 3 side of the application surface 5*a* in the photoelectric conversion element attaching section 5. The through-hole 69 passes through the photoelectric conversion element attaching section 5 in the radial direction. The space between the package 10 of the photoelectric conversion element 11 (see, for example, FIG. 3) and the first optical function surface 3*a* can be ventilated outside of the photoelectric conversion element attaching section 5 by the through-hole 69. Therefore, condensation can be prevented from being formed on the lens 3 and the package 10.

In the optical module holder 65 of the first variation example formed as described above, as according to the optical module holder shown in FIG. 16 and FIG. 17, when the photoelectric conversion element 11 is temporarily fixed, the ultraviolet rays can be transmitted through the thin-walled section 67 and sufficiently irradiated onto the UV curable adhesive 7 on the application surface 5*a* near the thin-walled section 67 in a short amount of time. As a result, the hardening time of the UV curable adhesive 7 can be shortened from the conventional hardening time. Temporary fixing can be quickly performed.

In the first variation example as well, the application surface 5*a* is formed near the photoelectric conversion element side end section of the photoelectric conversion element attaching section 5. Therefore, the application operation for the UV curable adhesive 7 can is facilitated. The design concept in which the photoelectric conversion element 11 is fixed at a position farther away from the lens 3 than those according to each embodiment described above can be supported.

Furthermore, in the first variation example, the photoelectric conversion element side end section on the inner circumferential surface of the photoelectric conversion element attaching section 5 is widened by the taper 68. Therefore, application of the UV curable adhesive 7 and disposal of the adhesive 22 (see, for example, FIG. 4) are facilitated. Operability can be further improved.

Figure 20:
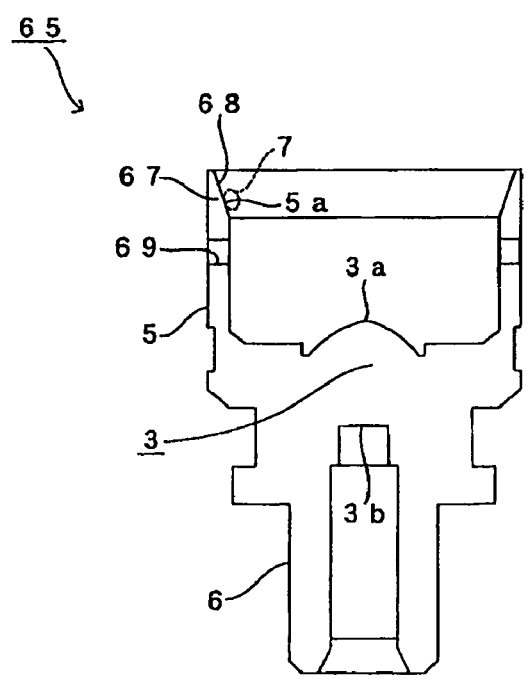
FIG. 20 is a front view of an optical module holder in which a position of an application surface differs from that in FIG. 18, in the first variation example of the optical module holder, the optical module, and the optical connector according to the fifth embodiment of the present invention.

The application surface 5*a* is not limited to that shown in FIG. 19 and can be set on the taper 68 as shown in FIG. 20. In this case as well, as in the optical module holder shown in FIG. 19, the hardening time of the UV curable adhesive 7 can be shortened. Temporary fixing can be quickly performed.

(Second Variation Example)

Figure 21:
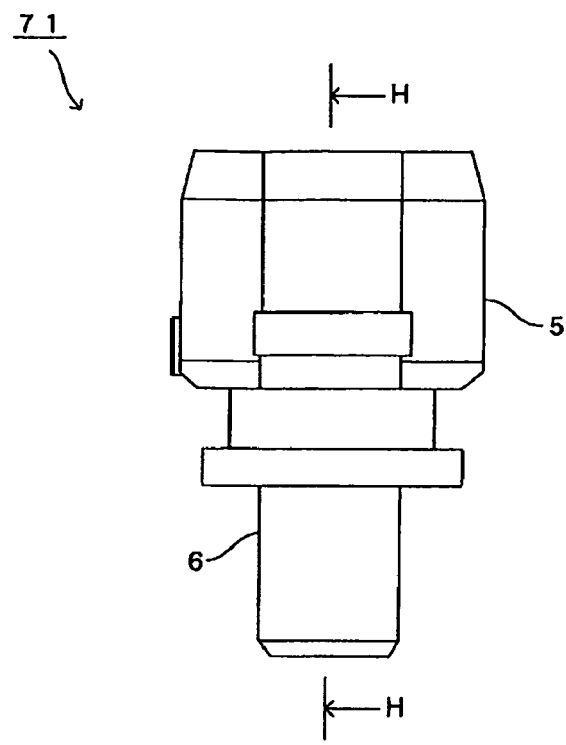
FIG. 21 is a front view of an optical module holder in a second variation example of the optical module holder, the optical module, and the optical connector according to the fifth embodiment of the present invention.
Figure 22:
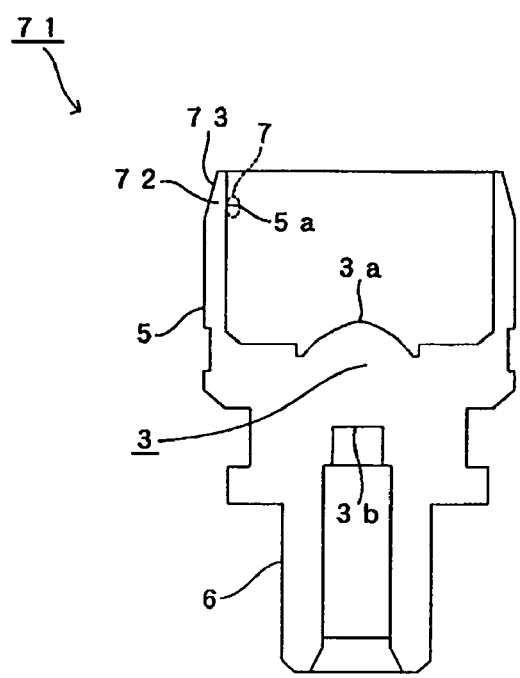
FIG. 22 is a cross-sectional view taken along H-H in FIG. 21.

An optical module holder 71 shown in FIG. 21 and FIG. 22 can be used as a second variation example according to the embodiment. FIG. 21 is a front view of the optical module holder 71 of the first variation example. FIG. 22 is a cross-sectional view taken along H-H in FIG. 21.

As shown in FIG. 22, in the optical module holder 71 of the second variation example, like the optical module holder shown in FIG. 16 and FIG. 17, a thin-walled section 72 is formed on the photoelectric conversion element side end section (an upper end section in FIG. 22) of the photoelectric conversion element attaching section 5. The application surface 5a is set near the photoelectric conversion element side end section on the inner circumferential surface of the photoelectric conversion element attaching section 5.

However, in the second variation example, a taper 73 is formed on the photoelectric conversion element attaching section 5, in a predetermined region from the photoelectric conversion element side end section on the inner circumferential surface of the photoelectric conversion element attaching section 5 towards the lens 3 side. An outer diameter of the taper 73 increases towards the lens 3 side. The thin-walled section 72 is formed by a section sandwiched between the taper 73 and the inner circumferential surface of the photoelectric conversion element attaching section 5. According to the embodiment, the application surface 5a is set on an inner circumferential surface of the thin-walled section 72.

In the optical module holder 65 of the second variation example formed as described above, as according to the optical module holder shown in FIG. 16 and FIG. 17, when the photoelectric conversion element 11 is temporarily fixed, the ultraviolet rays can be transmitted through the thin-walled section 72 and sufficiently irradiated onto the UV curable adhesive 7 on the application surface 5a in a short amount of time. As a result, the hardening time of the UV curable adhesive 7 can be shortened from the conventional hardening time. Temporary fixing can be quickly performed.

In the second variation example as well, the application surface 5a is formed near the photoelectric conversion element side end section of the photoelectric conversion element attaching section 5. Therefore, the application operation for the UV curable adhesive 7 can is facilitated. The design concept in which the photoelectric conversion element 11 is fixed at a position farther away from the lens 3 than those according to each embodiment described above can be supported.

EXAMPLES

First Example

Figure 23:
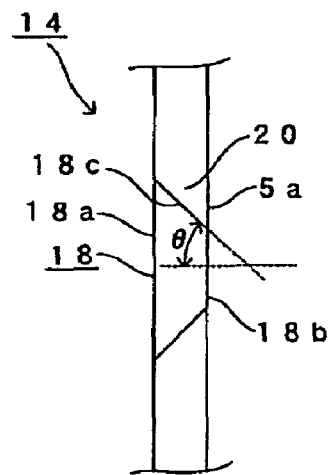
FIG. 23 is an explanatory diagram of a tapering angle in the optical module holder according to the first embodiment.

Next, a first example of the present invention will be described with reference to FIG. 23 to FIG. 25 and Table 1.

In the example, three kinds of samples (Samples 1 to 3 in Table 1) in which tapering angles θ(°) of the inner circumferential surface 18c of the through-hole 18 (see FIG. 23) differ are prepared as samples of the optical module holder 14 according to the first embodiment. A single kind of a sample (Sample 4 in Table 1) is prepared as a sample of the conventional optical module holder 1. The UV curable adhesive 7 is applied onto each application surface 5a of the four kinds of samples. The ultraviolet rays are then irradiated onto the UV curable adhesive 7 from the outer side of the photoelectric conversion element attaching sections 5. The hardening time of the UV curable adhesive 7 is measured.

An optical module holder formed by Ultem 1010-1000 (registered trademark) is used as each sample.

ThreeBond (registered trademark) 3170F is used as the UV curable adhesive 7. An application amount of the UV curable adhesive 7 is controlled by a dispenser of which an inner diameter of a needle is 0.26 millimeters and an outer diameter is 0.5 millimeters. More specifically, application conditions are that a dripping duration of the UV curable adhesive 7 onto the application surface 5a is 0.4 seconds and pressure is 22 (kg/cm$^2$).

Figure 24:
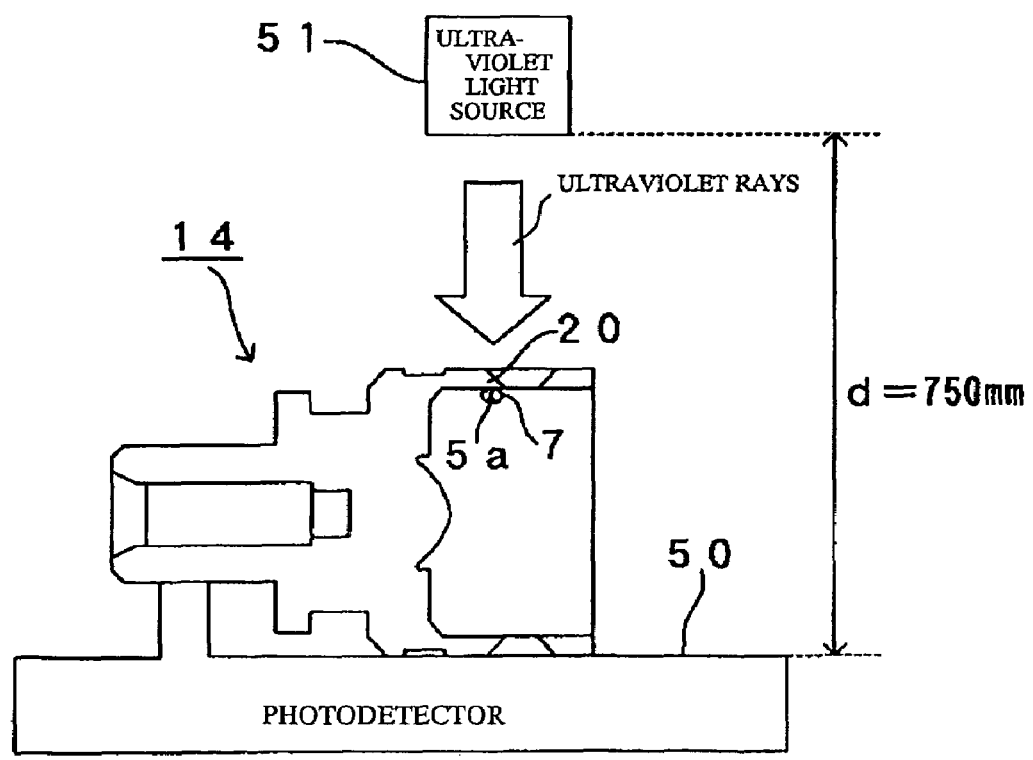
FIG. 24 is a configuration diagram of a testing system used to measure a hardening time of a UV curable adhesive applied onto the optical module holder according to the first embodiment.

In the example, as shown in FIG. 24, when a sample (in FIG. 24, the optical module holder according to the first embodiment) on which the UV curable adhesive 7 is applied onto the application surface 5a as described above is placed (horizontally) on a photodetector 50 so that one application surface 5a is positioned on an upper side, the sample is irradiated with the ultraviolet rays by an ultraviolet light source 51 provided at a position that is at a vertical upwards distance d=750 millimeters from a placing surface of the photodetector 50.

The photodetector 50 is used to measure the hardening time of the UV curable adhesive 7 and an accumulated light volume (mJ/cm$^2$). More specifically, ultraviolet ray irradiation conditions at this time are that an illumination intensity is 46 (mJ/cm$^2$) and an estimated light volume is 2754 (mW/cm$^2$).

Judgment of when the UV curable adhesive 7 has hardened is performed through confirmation of hardness by touching the UV curable adhesive 7 with a tip of a pair of tweezers while observing under a stereomicroscope at a magnification of 40 times.

Measurement results of the example are shown in Table 1 below and FIG. 25.

TABLE 1

| | Tapering angle (°) | Hardening time (sec) | Accumulated light volume (mJ/cm$^2$) |
|---|---|---|---|
| Sample 1 | 30 | 660 | 30360 |
| Sample 2 | 45 | 400 | 18400 |
| Sample 3 | 60 | 270 | 12420 |
| Sample 4 | 0 | 600 | 27600 |

Figure 25:
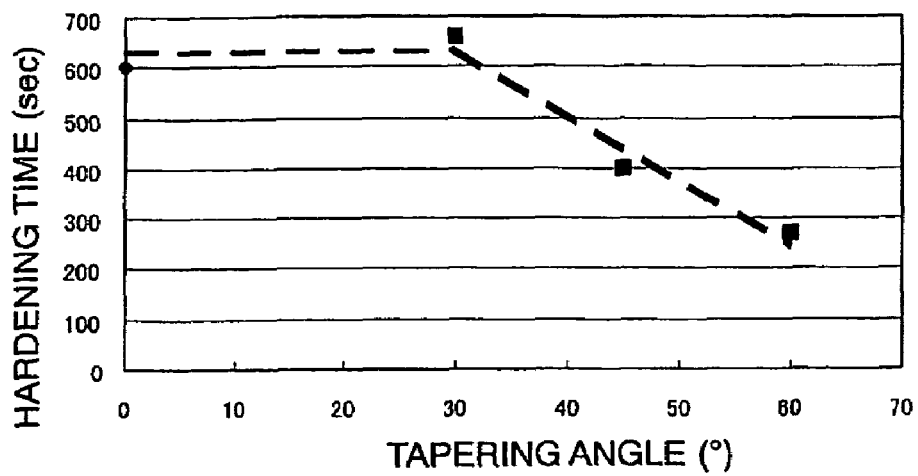
FIG. 25 is a graph of measurement results for a hardening time of a UV curable adhesive applied onto the optical module holder according to the first embodiment.

As shown in Table 1 and FIG. 25, when the tapering angle of the inner circumferential surface 18c of the through-hole 18 is 0 degrees to 30 degrees, only a slight difference can be measured in the hardening time of the UV curable adhesive 7. At the same time, when the tapering angle is from 30 degrees to 60 degrees, the hardening time of the UV curable adhesive 7 shortens proportionately with the tapering angle.

Therefore, from the measurement results of the example, a through-hole 18 of which the tapering angle is 35 degrees or more is preferably formed to form the thin-walled section 20 suitable for shortening the hardening time of the UV Qurable adhesive 7.

Second Example

A second example of the present invention will be described with reference to FIG. 26 and Table 2.

In the example, three kinds of samples (Samples 1 to 3 in Table 2) in which tapering angles (°) that are angles of the taper 68 in relation to the radial direction of the photoelectric conversion element attaching section 5 (horizontal direction in FIG. 20) differ are prepared as samples of the optical module holder 65 of the first variation example according to the fifth embodiment. A single kind of a sample (Sample 4 in Table 2) is prepared as a sample of the conventional optical module holder 1. The UV curable adhesive 7 is applied onto each application surface 5a of the four kinds of samples. The ultraviolet rays are then irradiated onto the UV curable adhesive 7 from the outer side of the photoelectric conversion element attaching sections 5. The hardening time of the UV curable adhesive 7 is measured.

However, in the example, the application surfaces 5a of the samples 1 to 3 are set on the tapers 68 as shown in FIG. 20.

Formation material of each sample, material of the UV curable adhesive 7, application method of the UV curable adhesive 7 onto the application surface 5a, irradiation method of the ultraviolet rays onto the UV curable adhesive 7, and other measurement conditions are the same as those in the first example.

Measurement results of the example are shown in Table 2 below and FIG. 26.

TABLE 2

|  | Tapering angle (°) | Hardening time (sec) |
|---|---|---|
| Sample 1 | 30 | 270 |
| Sample 2 | 45 | 210 |
| Sample 3 | 60 | 120 |
| Sample 4 | 0 | 630 |

Figure 26:
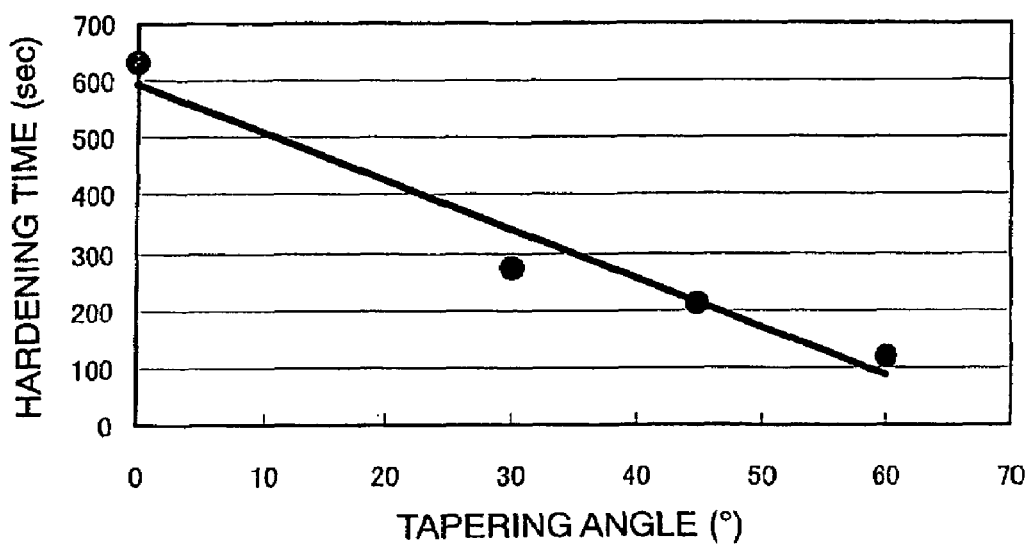
FIG. 26 is a graph of measurement results for a hardening time of a UV curable adhesive applied onto the optical module holder according to the second embodiment.

As shown in Table 2 and FIG. 26, in the example, the hardening time of the UV curable adhesive 7 shortens proportionately with the tapering angle.

Third Embodiment

A third example of the present invention will be described with reference to FIG. 27 and Table 3.

In the example, two kinds of samples (Samples 1 and 2 in Table 3) in which thicknesses of the thin-walled section 38 differ are prepared as samples having a configuration in which the through-hole 39 is eliminated from the optical module holder 36 in the variation example according to the third embodiment. A single kind of a sample (Sample 3 in Table 3) that does not have a thin-walled section of which a thickness of a section equivalent to the application surface 5a in the photoelectric conversion element attaching section 5 is 0.4 millimeters is prepared as a sample of the conventional optical module holder 1. The UV curable adhesive 7 is applied onto each application surface 5a of the three kinds of samples. The ultraviolet rays are then irradiated onto the UV curable adhesive 7 from the outer side of the photoelectric conversion element attaching sections 5. The hardening time of the UV curable adhesive 7 is measured.

The formation material of each sample, the material of the UV curable adhesive 7, the application method of the UV curable adhesive 7 onto the application surface 5a, the irradiation method of the ultraviolet rays onto the UV curable adhesive 7, and other measurement conditions are the same as those in the first example.

Measurement results of the example are shown in Table 3 below and FIG. 27. For convenience, the thickness (0.4 mm) of the photoelectric conversion element attaching section 5 in the sample 3 is handled as a thin-walled section.

TABLE 3

|  | Thin-walled section thickness (mm) | Hardening time (sec) |
|---|---|---|
| Sample 1 | 0.1 | 150 |
| Sample 2 | 0.2 | 360 |
| Sample 3 | No thin-walled section | 630 |

Figure 27:
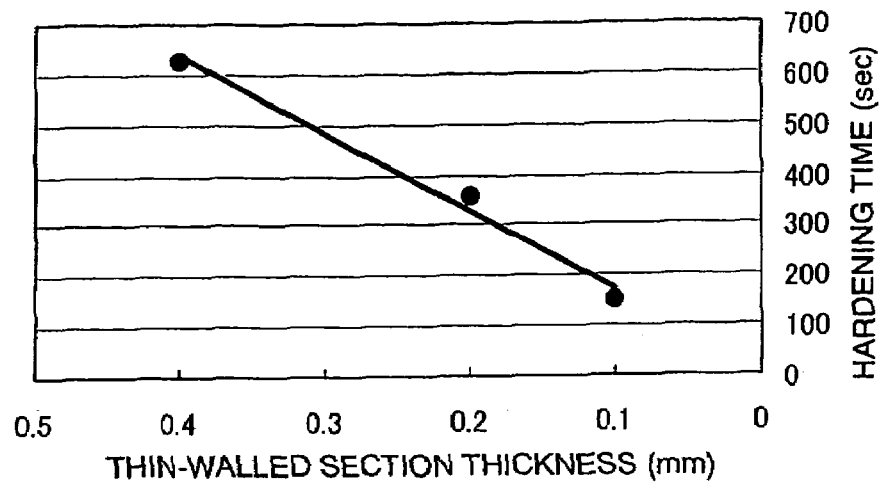
FIG. 27 is a graph of measurement results for a hardening time of a UV curable adhesive applied onto the optical module holder according to the third embodiment.

As shown in Table 3 and FIG. 27, in the example, the hardening time of the UV curable adhesive 7 shortens proportionately with a reduction in the thickness of the thin-walled section 38.

The present invention is not limited to the above-described embodiments. Various modifications can be made as required.

Figure 28:
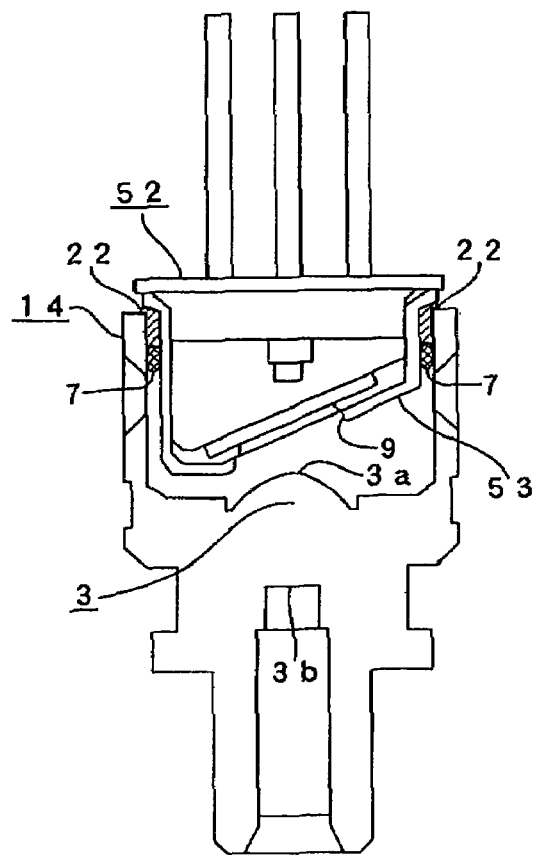
FIG. 28 is a vertical cross-sectional view of a variation example of an optical module.
Figure 29:
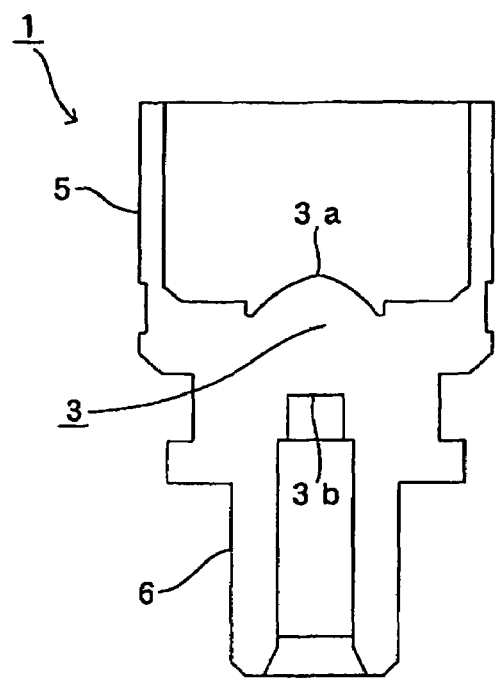
FIG. 29 is a vertical cross-sectional view of an example of a conventionally used optical module holder.
Figure 30:
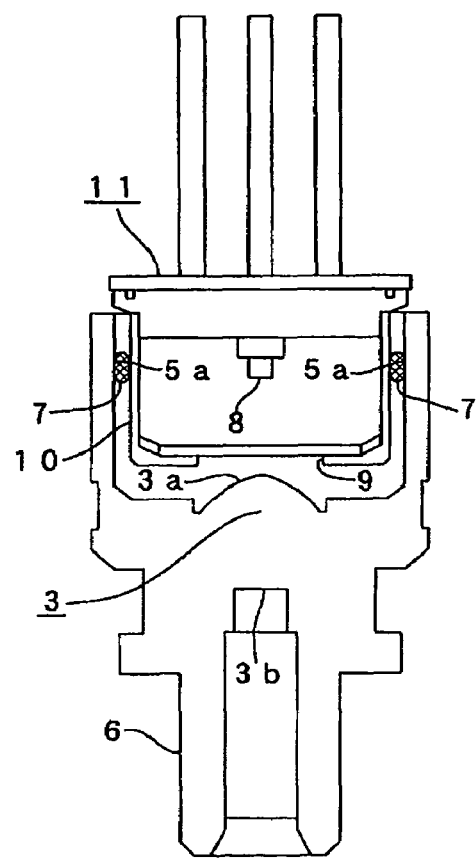
FIG. 30 is a diagram of an application state of the UV curable adhesive onto an optical module holder in FIG. 29 and an insertion state of a photoelectric conversion element.
Figure 31:
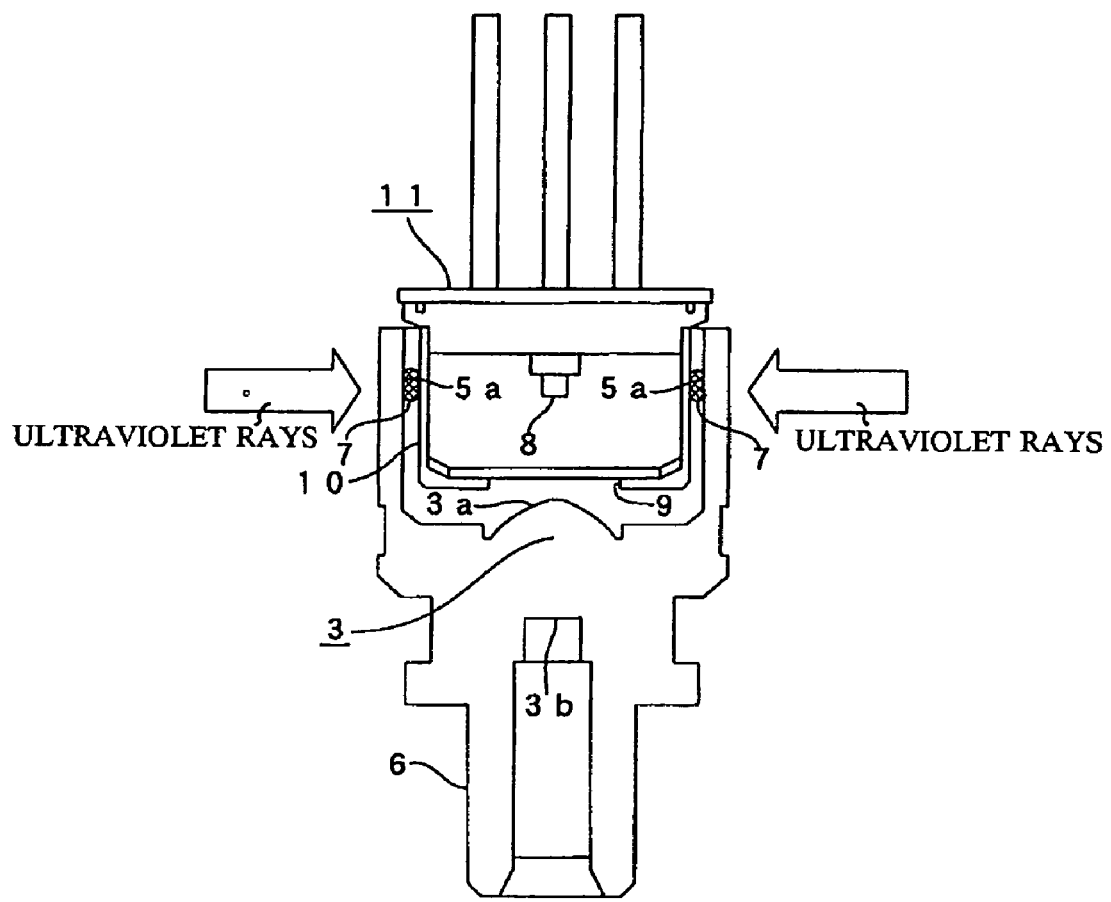
FIG. 31 is a diagram of an ultraviolet ray irradiation state of the optical module holder in FIG. 30.

For example, as shown in FIG. 28, the optical module holder according to each above-described embodiment (in FIG. 28, the optical module holder according to the first embodiment) can be applied to a photoelectric conversion element 52 in which a surface facing the first optical function surface 3a of a package 53 is at an angle to the optical axis direction of the lens 3.

The present invention can be effectively applied to temporary fixing of a photoelectric conversion element including a light-receiving element instead of the light-emitting element and a photoelectric conversion element including the light-receiving element in addition to the light-emitting element. The shape of the opening on the inner circumferential surface of the photoelectric conversion element attaching section 5 can be circular, elliptical, polygonal, and the like.

What is claimed is:

1. An optical module holder comprising:
   an optical coupling section that optically couples an optical element and an end section of an optical transmission line;
   a cylindrical optical element attaching section for attaching the optical element at a position facing one optical function surface of the optical coupling section, said optical element attaching section being made of a UV transmitting material and having a thin-walled section;
   an optical transmission line attaching section for attaching the end section of the optical transmission line at a position facing another optical function surface of the optical coupling section; and
   an ultraviolet curable adhesive provided on said thin-walled section having a thickness less than or equal to 0.4 mm for bonding said optical element to said optical element attaching section; and
   wherein, when the optical element is adhered to the optical element attaching section by said ultraviolet curable adhesive through ultraviolet rays being irradiated onto the ultraviolet curable adhesive disposed on a predetermined disposal surface on an inner circumferential surface of the optical element attaching section so as to pass through the optical element attaching section from an outer side of the optical element attaching section, said thin-walled section maintains transmittance of the ultraviolet rays passing through the optical element attaching section at a predetermined value or higher to cure said adhesive.

2. The optical module holder according to claim 1, wherein:
   a through-hole passing from an outer circumferential surface of the optical element attaching section to the inner circumferential surface of the optical element attaching section, of which an entire circumference decreases towards an inner radial direction side of the optical element attaching section, and having a shape in which a portion of an inner circumferential surface of the through-hole is positioned on an outer radial direction side of the optical element attaching section in relation to the disposal surface is formed near the disposal surface on the optical element attaching section, and the thin-walled section is formed by a section sandwiched between the disposal surface on the optical element attaching section and the portion of the inner circumferential surface of the through-hole.

3. The optical module holder according to claim 2, wherein:
   an opening of the through-hole on the outer circumferential surface of the optical element attaching section is formed into a circular shape;

an opening of the through-hole on the inner circumferential surface of the optical element attaching section is formed into a circular shape having a diameter smaller than that of the opening on the outer circumferential surface; and the inner circumferential surface of the through-hole is shaped into a tapered shape.

4. The optical module holder according to claim 2, wherein:

an opening of the through-bole on the outer circumferential surface of the optical element attaching section is formed into a polygonal shape formed from a plurality of side sections and in which a shape refracting towards an inner side of the opening and a shape refracting towards an outer side of the opening along an entire-circumference direction of the opening alternately appear;

an opening of the through-hole on the inner circumferential surface of the optical element attaching section is a polygonal shape smaller than the opening on the outer circumferential surface and formed from a plurality of side sections respectively parallel with the plurality of side sections of the opening on the outer circumferential surface; and an inner circumferential surface of the through-hole is formed into a shape having a plurality of angled surfaces connecting mutually parallel side sections of the opening on the outer circumferential surface and the opening on the inner circumferential surface.

5. The optical module holder according to claim 1, wherein:

a concave section recessing towards an inner radial direction side of the optical element attaching section is formed on an outer radial direction side of the optical element attaching section in a position opposing the disposal surface on the outer circumferential surface of the optical element attaching section, and the thin-walled section is formed by a section sandwiched between the disposal surface on the optical element attaching section and the concave section.

6. The optical module holder according to claim 1, wherein:

the disposal surface is concavely formed towards an outer circumferential surface side of the optical element attaching section to prevent the ultraviolet curable adhesive from flowing into the optical element side, and the thin-walled section is formed by a section sandwiched between the disposal surface on the optical element attaching section and the outer circumferential surface of the optical element attaching section.

7. The optical module holder according to claim 1, wherein the optical module holder is integrally formed by a same material.

8. An optical module comprising:

an optical module holder according to any one of claims 1 to 7; and wherein said optical element is at least one of either a light-emitting element or a light-receiving element.

9. An optical connector comprising:

an optical module according to claim 8; and housing holding the optical module.

10. The optical module holder according to claim 1, wherein a UV transmittance of said optical element attaching section is greater than 10%.

* * * * *